United States Patent
Madison et al.

(10) Patent No.: US 10,482,628 B2
(45) Date of Patent: Nov. 19, 2019

(54) PHOTOGRAMMETRIC POINT CLOUD COMPRESSION FOR TACTICAL NETWORKS

(71) Applicant: United States of America as Represented by The Secretary of The Army, Alexandria, VA (US)

(72) Inventors: Andrew C Madison, Alexandria, VA (US); Richard D Massaro, Alexandria, VA (US); Clint B Smith, Chantilly, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 15/832,695

(22) Filed: Dec. 5, 2017

(65) Prior Publication Data
US 2019/0102913 A1    Apr. 4, 2019

Related U.S. Application Data

(60) Provisional application No. 62/566,369, filed on Sep. 30, 2017.

(51) Int. Cl.
```
G06T 9/00     (2006.01)
G06T 7/521    (2017.01)
G01S 17/89    (2006.01)
H04N 19/172   (2014.01)
H04N 19/42    (2014.01)
H04N 19/90    (2014.01)
```

(52) U.S. Cl.
CPC ............... *G06T 9/00* (2013.01); *G01S 17/89* (2013.01); *G06T 7/521* (2017.01); *H04N 19/172* (2014.11); *H04N 19/42* (2014.11); *H04N 19/90* (2014.11); *G06T 2207/10028* (2013.01)

(58) Field of Classification Search
None
See application file for complete search history.

(56) References Cited

U.S. PATENT DOCUMENTS

| | | | |
|---|---|---|---|
| 9,530,225 B1 | 12/2016 | Nieves | |
| 9,562,971 B2* | 2/2017 | Shenkar | G01S 17/023 |
| 9,753,124 B2 | 9/2017 | Hayes | |
| 10,229,330 B2* | 3/2019 | Li | G06T 7/12 |
| 10,229,533 B2* | 3/2019 | Tian | G06T 7/521 |

(Continued)

OTHER PUBLICATIONS

"3D point cloud compression using conventional image compression for efficient data transmission", by Hamidreza Houshiar & Andreas Nuchter, 2015 XXV International Conference on Information, Communication and Automation Technologies (ICAT), pp. 1-8, Oct. 2015. (Year: 2015).*

(Continued)

*Primary Examiner* — James A Thompson
(74) *Attorney, Agent, or Firm* — Brian C. Jones

(57) ABSTRACT

The invention is a method and system which uses photogrammetric data and functions to perform image-based deconstruction of 3D point cloud data sets. These standard image formats from associated metadata can be easily serialized, transmitted, and subsequently reconstructed using established stereo photogrammetric methods.

14 Claims, 2 Drawing Sheets

(56) References Cited

U.S. PATENT DOCUMENTS

| | | | | |
|---|---|---|---|---|
| 2012/0246166 | A1* | 9/2012 | Krishnaswamy | G06T 17/00 |
| | | | | 707/741 |
| 2014/0267606 | A1* | 9/2014 | Lazar | H04N 19/597 |
| | | | | 348/43 |
| 2015/0323672 | A1* | 11/2015 | Shenkar | G01S 17/023 |
| | | | | 382/154 |
| 2017/0213093 | A1* | 7/2017 | Li | G06T 7/12 |
| 2017/0214943 | A1 | 7/2017 | Cohen | |
| 2017/0347055 | A1* | 11/2017 | Dore | G06T 7/90 |
| 2017/0372488 | A1* | 12/2017 | Brown | G06T 7/50 |
| 2018/0122137 | A1* | 5/2018 | Tian | G06T 7/521 |

OTHER PUBLICATIONS

"Adaptive compressive-sensing of 3D point clouds", by Vahid Behravan, Gurjeet Singh, and Patrick Y. Chiang, 2017 IEEE 2nd International Conference on Signal and Image Processing (ICSIP), pp. 188-192, Aug. 2017. (Year: 2017).*

* cited by examiner

PHOTOGRAMMETRIC POINT CLOUD COMPRESSION FOR TACTICAL NETWORKS

CROSS-REFERENCE TO RELATED APPLICATIONS

This patent application claims the benefit of U.S. Provisional Application No. 62/566,369 filed Sep. 30, 2017. The above application is incorporated by reference herein.

STATEMENT REGARDING FEDERALLY SPONSORED RESEARCH OR DEVELOPMENT

The invention described herein was made by employees of the United States Government and may be manufactured and used by the Government of the United States of America for governmental purposes without the payment of any royalties thereon or therefore.

FIELD OF INVENTION

The method pertains the field of data compression, and more specifically to data compression method which reconstructs data using photogrammetric methods.

BACKGROUND OF THE INVENTION

Light Detection and Ranging (LIDAR), is a remote sensing method that uses light in the form of a pulsed laser to measure ranges (variable distances) to the Earth. These light pulses—combined with other data recorded by the airborne system—generate precise, three-dimensional information about the shape of the Earth and its surface characteristics. LIDAR files include site topography, building location, structure, orientation, and line of sight.

Airplanes, helicopters and satellites are the most commonly used platforms for acquiring LIDAR data over broad areas.

LIDAR systems allow scientists and mapping professionals to provide scientists with highly accurate information about both natural and manmade environments.

LIDAR systems are currently used to produce more accurate shoreline maps, to make digital elevation models for use in geographic information systems, to assist in emergency response operations, and in many other applications.

When LIDAR is used for intelligence, surveillance and reconnaissance missions, large amounts of information must be sent over networks with minimal bandwidth. LIDAR files are generally larger than 2 GB and therefore unsuitable for rapid transmission over limited bandwidth. Current data compression methods generally result in a compression ratio of only 10 to 100.

There is an unmet demand for data compression methods that offer high compression ratios, with minimal information loss, to transmit LIDAR and other point cloud data using existing communication standards.

BRIEF SUMMARY OF THE INVENTION

The method is a point cloud compression method which recursively subdivides three-dimensional (3D) space into octants whose terminal nodes may hold the place of a single point.

The method performs photogrammetric deconstruction of 3D point cloud models storing 3D model information in a series of overlapping images determined by a novel angular step size value function. This function applies geometric data and photogrammetric techniques which geometrically deconstruct point cloud data sets into deconstructed image sets along an orbital path. The deconstructed image files contain data for overlapping images which may be reconstructed by applying existing stereo photogrammetric image alignment tools, well known in the art. The resulting deconstructed image files have compression ratios on the order of 250 while retaining tactical information and accurate georegistration data.

TERMS OF ART

Figure 1:
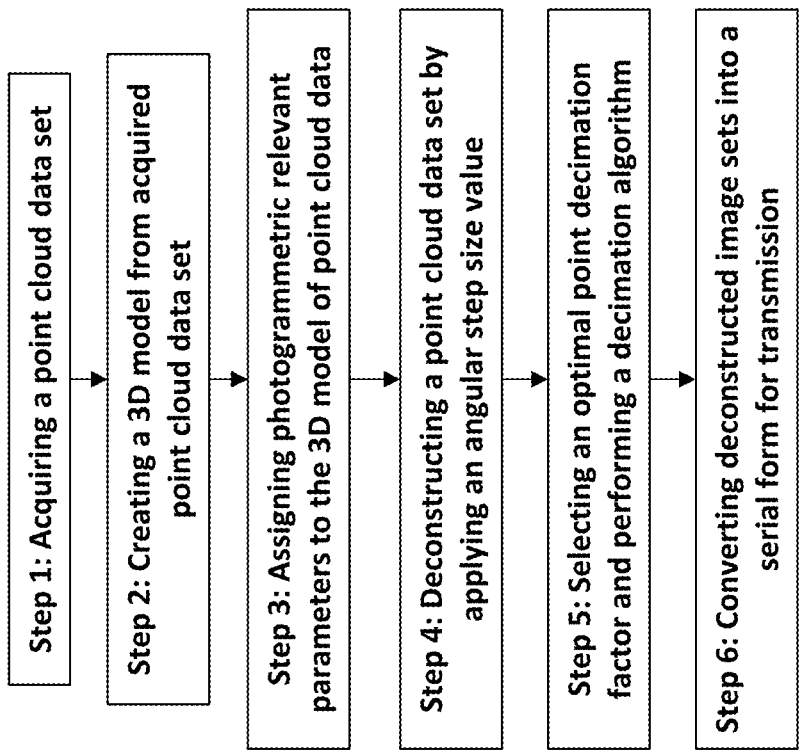
FIG. 1 illustrates exemplary point-cloud compression which performs image-based deconstruction and photogrammetric reconstruction of three-dimensional Models.

As used herein, the term "association" means a relationship which correlates one data value or one or more data sets for access by computations.

As used herein, the term "associated data structure" means linked, related, or configured for access.

As used herein, the term "angular step size" means a user-defined angle measurement between two adjacent sampled images of the 3D model.

As used herein, the term "class" means a virtual processing component from which other objects and/or virtual processing components are instantiated; objects and/or virtual processing components within a class may have common attributes and functions.

As used herein, the term "commercial off the shelf" (COTS) means products that are available for purchase.

As used herein, the term "corresponding position" ($x_s$) means the position coordinates of the sensor for each image file.

As used herein, the term "data compression ratio" means the quotient of the size of the uncompressed data divided by the size of the compressed data.

As used herein, the term "focal point" means a selected point in a scene, which may be associated with position coordinates.

As used herein, the term "georegistration" means associating real-world position coordinates with points in a data set.

As used herein, the term "Light Detection and Ranging" (LIDAR) means a system that uses pulsed laser light to measure distances between the sensor and various points on objects external to the sensor. LIDAR sensors may be stationary or moving, including sensors that are mounted to airplanes, or helicopters.

As used herein, the term "location point" means an individual point detected by a sensor that is associated with position coordinates.

As used herein, the term "object" means a virtual processing component that contains both data and data structures, and code which performs operations on the data structures.

As used herein, the term "orbital path" means the path of the sensor while capturing the scene.

As used herein, the term "point cloud data" means data points representing locations in a 3-D coordinate system that may or may not be virtual. Point cloud data may be collected by a LIDAR system.

As used herein, the term "point decimation" means the process of eliminating pixels or data points from a file in a uniform pattern, using a point decimation factor. Point decimation can enable data compression additional to image deconstruction.

As used herein, the term "point decimation factor" ($f_d$) means rational fraction to uniformly reduce the point density of the original point cloud.

As used herein, the term "quasi-unique" means unique to a project or data set.

As used herein, the term "radius" (r) means the horizontal distance between the focal point of a scene and the location of the sensor for each image.

As used herein, the term "structural similarity index measure" (SSIM) means a value that indicates the similarity between two images.

As used herein, the term "virtual processing component" means memory, operatively coupled with a computer processor.

As used herein, the term "visualizing" means extracting position coordinates from point cloud data points and displaying the data points in 3-D image format.

DETAILED DESCRIPTION OF THE INVENTION

FIG. 1 illustrates exemplary point-cloud compression Method 100, which performs an angular step size deconstruction function to obtain deconstructed image data sets and subsequently reconstruct three-dimensional models photogrammetrically.

The method performs a deconstruction function point cloud data set to obtain deconstructed image data sets. The deconstructed image data sets are geometrically determined subsets of point cloud image data corresponding to locations along an orbital path.

Each deconstructed image may be transmitted using established protocols known in the art. The data may subsequently be reconstructed using photogrammetry software and processes known in the art.

Step 1 is the step of acquiring a point cloud data set. In various embodiments, point cloud data may be collected by a mobile LIDAR system or other cameras or sensors positioned on air borne vehicles or satellites. In one exemplary embodiment, data is collected from a LIDAR system known in the art which operates at a wavelength of 1550 nm with peak pulse power of 1 kW, average power less than 250 mW, and a pulse width less than 5 ns. In various embodiments, the LIDAR system includes a laser that can operate at 75, 125, 250 or 500 kHz for a maximum point collection of 1 million points per second.

Step 2 is the step of creating a 3D model from an acquired point cloud data set. In this step, data is extracted using a Visualization Toolkit (VTK) extension for the Python programming language, which includes functions to visualize, decimate, and deconstruct point cloud data into geotagged images.

Step 3 is the step of assigning photogrammetric relevant parameters to the 3D point cloud data model. This step initiates the deconstruction process. Parameters assigned during this step include a focal point of the scene, $x_c$, radius of interest, r, and collection height, h. The data types identified parameterize the center, scale, and vantage point of the scene captured by the point cloud data set.

Step 4 is the step of deconstructing a point cloud data set by applying angular step size value, $\Delta\theta$. The angular step size value, $\Delta\theta$, determines the total number of images captured along a circular orbit, which are each associated with a corresponding position $x_s$, and are positioned at a distance h above the focal point $x_c$, and with radius, r.

In various embodiments, a larger angular step size will result in more rapid processing, but will result in fewer images being sampled. A smaller step size results in a larger number of images sampled.

A maximum angular step size value, $\Delta\theta$, suggests an upper theoretical bound to the compression ratio obtainable by photogrammetric deconstruction. To determine the maximum angular step size, point cloud density was held constant at the collection density ($\rho=1060$ m$^{-2}$) while point cloud deconstruction, transmission, and reconstruction were carried out as described in this method. Reconstruction success or failure was noted for increasing values of $\Delta\theta$ beginning at $$\frac{\pi}{25}.$$

Furthermore, the maximum angular step size for successful model reconstruction was found to be $$\Delta^\theta = \frac{\pi}{15},$$

while promising results were observed in terms of georegistration of reconstructed models.

Step 5 is the step of selecting an optimal point decimation factor, $f_d$, and performing a decimation algorithm. The point decimation factor is a value expressed as an integer or a rational fraction greater than or equal to one. It quantifies the rate at which the points in a point cloud data set are eliminated.

Point decimation enables further compression in addition to image deconstruction, but diminishes accuracy in the reconstruction process. To optimize the resulting quality of the image files relative to compression, data is reconstructed and tested by calculating the structural similarity index measure (SSIM) between pairs of image files. The SSIM is computed for sets of pair-wise for each set of images, comparing the deconstructed images to corresponding scenes rendered from the reconstructed model.

In various embodiments, log-spaced point decimation factors ranging from 1 (undecimated) to 1000 may be implemented to assess the impact of point density on reconstruction model quality while the nominal angular step size of $\Delta\theta$ is held constant.

In various embodiments, the SSIM can be used to select an optimal point decimation factor. In various embodiments, the SSIM can also be used to select an optimum compression ratio, which equals the sum of the sizes of each point cloud data file, $s_k$, divided by the sum of the sizes of each image file, $s_i$, which is a function of point density, $\rho$, angular step size, $\Delta\theta$, and image resolution, $l_{Res}$.

Step 6 is the step of converting deconstructed image sets into a serialized form for transmission.

Once deconstructed, an image set may be transmitted in a variety of protocols relevant to tactical networks, including transmission control protocol/internet protocol (TCP/IP) and user datagram protocol (UDP).

Figure 2:
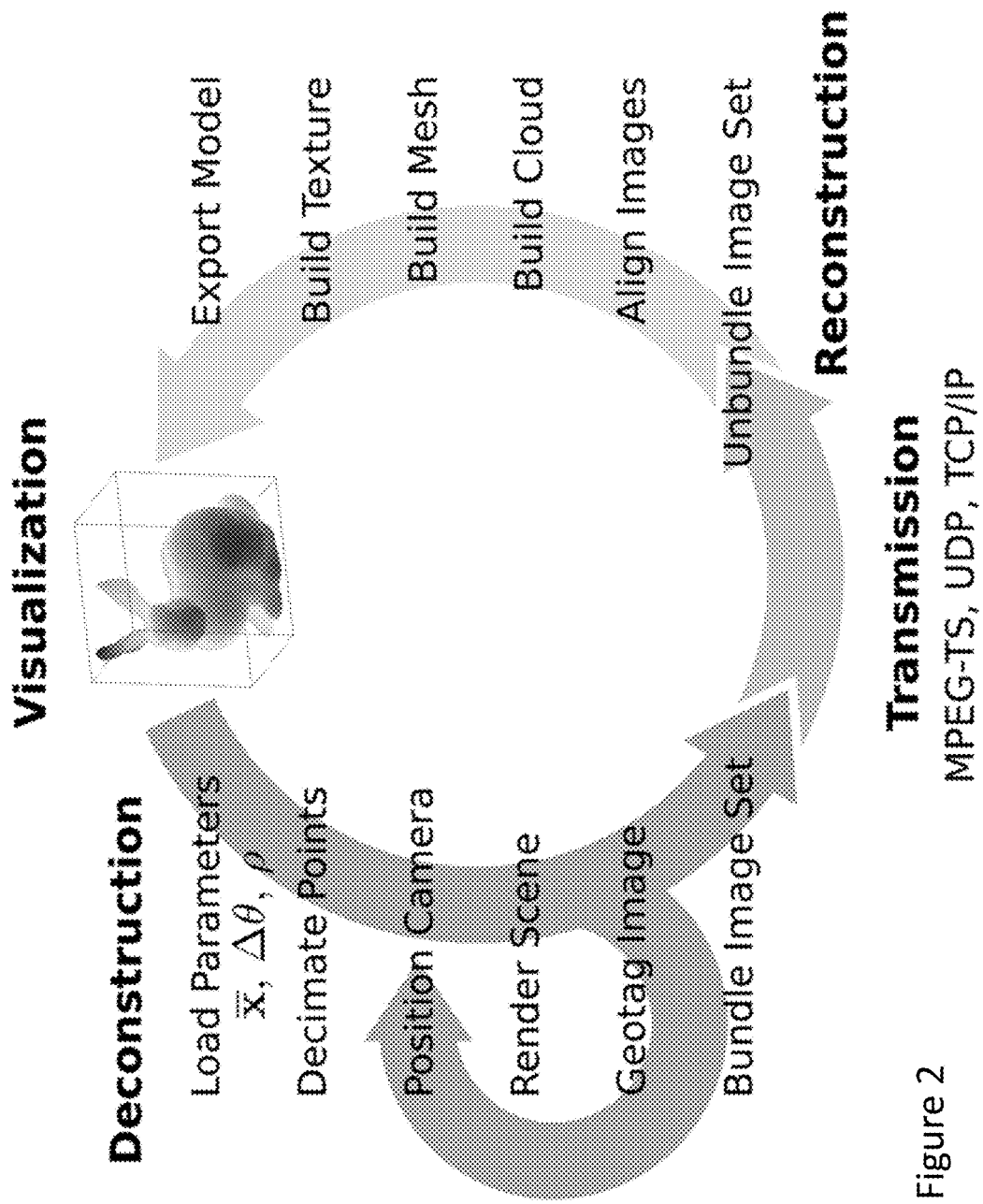
FIG. 2 illustrates an exemplary cycle of deconstructing and reconstructing a point cloud data set using photogrammetric processes.

FIG. 2 illustrates an exemplary cycle of deconstructing and reconstructing a point cloud data set using photogrammetric processes.

Photogrammetric deconstruction allows transmission of point cloud data to be suitable for bandwidth-limited networks. Data compression is accomplished by deconstructing a 3D model into a series of geotagged images that may be transmitted using established protocols and subsequently reconstructed using COTS or open source photogrammetry tools.

What is claimed is:

1. A computer configured with instructions to perform processing and access memory to photogrammetrically compress point cloud data, wherein said instructions are comprised of the steps of:
    receiving a point cloud data set containing point cloud data points captured by a to sensor, wherein said point cloud data points represent position values of said sensor, location parameters, and geographical coordinates of images corresponding to said point cloud data set;
    receiving values representing position coordinates of a focal point;
    performing a function to create a first subset of point cloud data representing orbital radius r, wherein said orbital radius r is the horizontal distance from said focal point to said sensor;
    performing a function to obtain a second subset of point cloud data point values representing the orbital path corresponding to said radius r and said position values of said sensor;
    receiving a point decimation factor;
    receive an angular step size $\Delta\theta$;
    eliminating a number of data points corresponding to said point decimation factor and creating a number of images corresponding to angular step size $\Delta\theta$ to create a number of deconstructed image sets; performing a quality verification by calculating an SSIM value for two or more deconstructed image sets each having a unique value for said angular step size $\Delta\theta$, and comparing said SSIM values to select a value for said angular step size $\Delta\theta$;
and converting said deconstructed image sets into serial form for transmission.

2. The method of claim 1 wherein each of said deconstructed image sets is associated with an area having corresponding position coordinates, $x_s$, within said orbital path of said sensor, in angular increments of said angular step size $\Delta\theta$ and each of said deconstructed image sets is further associated with a focal point, $x_c$.

3. The method of claim 1, which further includes the step of creating a three-dimensional model from said point cloud data set that is a user interface.

4. The method of claim 3, which further includes the step of invoking functions to calculate photogrammetric relevant parameters using said three-dimensional model, wherein said photogrammetric relevant parameters include but are not limited to orbital to radius r, focal point position coordinates, and orbital path position coordinates.

5. The method of claim 1 wherein the maximum value of said angular step size $$\Delta\theta \text{ is } \Delta^\theta = \frac{\pi}{15}.$$

6. The method of claim 1 wherein said angular step size $\Delta\theta$ is a user input value.

7. The method of claim 1 which further includes the step of verifying the accuracy of reconstruction by calculating a Structurally Similar Index Metric (SSIM) value.

8. A computer configured with instructions to perform processing and access memory to photogrammetrically compress point cloud data, wherein said instructions are comprised of the steps of:
    receiving a point cloud data set containing point cloud data points captured by a sensor, wherein said point cloud data points represent position values of said sensor, location parameters, and geographical coordinates of images corresponding to said point cloud data set;
    receiving values representing position coordinates of a focal point;
    performing a function to create a first subset of point cloud data representing orbital radius r, wherein said orbital radius r is the horizontal distance from said focal point to said sensor;
    performing a function to obtain a second subset of point cloud data point values representing the orbital path corresponding to said radius r and said position values of said sensor;
    receiving a point decimation factor;
    receive an angular step size $\Delta\theta$;
    eliminating a number of data points corresponding to said point decimation factor and creating a number of images corresponding to angular step size $\Delta\theta$ to create a number of deconstructed image sets; performing a quality verification by calculating an SSIM value for two or more deconstructed image sets each having a unique value for said point decimation factor, and comparing said SSIM values to select a value for said point decimation factor;
    and converting said deconstructed image sets into serial form for transmission.

9. The method of claim 8, which further includes the step of creating a three-dimensional model from said point cloud data set that is a user interface.

10. The method of claim 9, which further includes the step of invoking functions to calculate photogrammetric relevant parameters using said three-dimensional model, wherein said photogrammetric relevant parameters include but are not limited to orbital radius r, focal point position coordinates, and orbital path position coordinates.

11. The method of claim 8 wherein the maximum value of said angular step size $$\Delta\theta \text{ is } \Delta^\theta = \frac{\pi}{15}.$$

12. The method of claim 8 wherein said angular step size $\Delta\theta$ is a user input value.

13. The method of claim 8 which further includes the step of verifying the accuracy of reconstruction by calculating a Structurally Similar Index Metric (SSIM) value.

14. The method of claim 8 wherein each of said deconstructed image sets is associated with an area having corresponding position coordinates, $x_s$, within said orbital path of said sensor, in angular increments of said angular step size $\Delta\theta$ and each of said to deconstructed image sets is further associated with a focal point, $x_c$.

* * * * *